(12) United States Patent
Garrett et al.

(10) Patent No.: US 10,605,414 B1
(45) Date of Patent: Mar. 31, 2020

(54) SUSPENDED LUMINAIRE HAVING END CAPS WITH LEDS ILLUMINATING A LIGHTGUIDE PLATE

(71) Applicant: Eaton Intelligent Power Limited, Dublin (IE)

(72) Inventors: Bradley Garrett, Evergreen, CO (US);
Travis Boyle, Denver, CO (US);
Alexander Ross, Aurora, CO (US);
William Getzinger, Conifer, CO (US);
John Leon, Parker, CO (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/495,697

(22) Filed: Apr. 24, 2017

Related U.S. Application Data

(60) Provisional application No. 62/326,567, filed on Apr. 22, 2016.

(51) Int. Cl.
| | |
|---|---|
| *F21S 8/06* | (2006.01) |
| *F21K 9/272* | (2016.01) |
| *F21K 9/61* | (2016.01) |
| *F21Y 115/10* | (2016.01) |

(52) U.S. Cl.
CPC ............ *F21K 9/272* (2016.08); *F21K 9/61* (2016.08); *F21S 8/061* (2013.01); *F21Y 2115/10* (2016.08)

(58) Field of Classification Search
CPC ..... F21S 8/061; F21S 8/04; F21S 8/06; F21V 21/008; F21V 2200/20; F21K 9/00
See application file for complete search history.

(56) References Cited

U.S. PATENT DOCUMENTS

| | | | |
|---|---|---|---|
| D31,763 S | 10/1899 | Locke | |
| 2,490,191 A | 12/1949 | Bake | |
| 2,574,579 A * | 11/1951 | McCoy | F16G 11/10 24/116 A |
| 2,744,190 A | 5/1956 | Kilemnik | |
| 3,267,276 A | 8/1966 | Hasler | |
| 6,161,939 A * | 12/2000 | Bansbach | F21S 8/061 362/223 |
| D444,262 S | 6/2001 | Eberlein et al. | |
| D477,105 S | 7/2003 | Herst et al. | |
| D588,739 S | 3/2009 | Janssen | |
| 8,052,315 B2 * | 11/2011 | Iwasaki | G02B 6/0068 362/608 |
| D654,208 S | 2/2012 | Marquardt et al. | |
| 8,231,259 B2 * | 7/2012 | Keller | F21S 8/06 362/404 |

(Continued)

OTHER PUBLICATIONS

LEDs magazine article "Eaton delivers curved LED-lit.scheme". Published Mar. 15, 2017. (6 pages).

*Primary Examiner* — Ismael Negron
(74) *Attorney, Agent, or Firm* — King & Spalding LLP (57) ABSTRACT

A luminaire includes a lightguide, end caps on respective ends of the lightguide, a contact block with a pair of apertures for receiving a pair of suspension cables, one or more light emitting diodes (LEDs) disposed within each end cap to project light into an edge of the lightguide, and a pair of suspension cables to support the luminaire and provide electrical power to the LEDs. A configurable power supply box, to be mounted to a ceiling or above a drop ceiling to provide power to the luminaire via the suspension cables, is also disclosed.

11 Claims, 11 Drawing Sheets

(56) References Cited

U.S. PATENT DOCUMENTS

| | | | |
|---|---|---|---|
| D669,625 S | 10/2012 | Herremans | |
| D703,361 S | 4/2014 | Kondou et al. | |
| 8,721,152 B2* | 5/2014 | Coleman | F21S 8/04 362/249.02 |
| 8,764,219 B2* | 7/2014 | Hasan | F21V 31/005 362/184 |
| D711,040 S | 8/2014 | Huang et al. | |
| D711,584 S | 8/2014 | Parker et al. | |
| 8,864,360 B2* | 10/2014 | Parker | F21V 29/70 362/612 |
| 8,915,611 B2* | 12/2014 | Zhang | F21S 2/005 362/241 |
| D735,928 S | 8/2015 | Hawkins et al. | |
| D745,735 S | 12/2015 | Tran et al. | |
| 9,429,286 B2* | 8/2016 | Luo | F21S 8/061 |
| 9,798,067 B2* | 10/2017 | Gassner | F21S 8/061 |
| 10,054,295 B2* | 8/2018 | Emde | F21S 6/003 |
| 2010/0321953 A1 | 12/2010 | Coleman et al. | |
| 2013/0155716 A1 | 6/2013 | Chen et al. | |
| 2014/0126193 A1 | 5/2014 | Dixon et al. | |
| 2015/0138829 A1 | 5/2015 | Jang | |
| 2017/0153014 A1* | 6/2017 | Chiu | F21V 21/002 |
| 2018/0039014 A1* | 2/2018 | Ju | F21S 8/061 |

* cited by examiner

Grid Installation

Figure 15

SUSPENDED LUMINAIRE HAVING END CAPS WITH LEDS ILLUMINATING A LIGHTGUIDE PLATE

RELATED APPLICATIONS

The present application claims priority under 35 U.S.C. § 119(e) to U.S. Provisional Patent Application No. 62/326,567, titled "Suspended Arc-Shaped Luminaire," and filed on Apr. 22, 2016. The entire contents of the foregoing application are hereby incorporated herein by reference.

TECHNICAL FIELD

Embodiments of the technology relate generally to illumination systems and more particularly to a suspended luminaire with a lightguide and endcaps.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. A need exists for light-emitting-diode-based systems that can couple light from light emitting diodes into edgelit lightguides for illumination. A need also exists for LED-based luminaires that can be installed easily and efficiently. A capability addressing one or more such needs, or some other related deficiency in the art, would support improved illumination and more widespread utilization of light emitting diodes in lighting applications.

SUMMARY

In general, in one aspect, the disclosure relates to a luminaire comprising a lightguide with end caps on respective ends of the lightguide. Each end cap comprises a contact block and each contact block has a pair of apertures for receiving a pair of suspension cables. At least one of the end caps has one or more light sources, such as an LED disposed therein which emits light into an edge of the lightguide. A pair of contacts within the end cap can receive electrical power from the pair of suspension cables and transmit the electrical power to the one or more light sources.

In another embodiment, the disclosure relates to a configurable power supply box that can provide power to a luminaire. The configurable power supply box comprises class 1 connections for receiving electrical power from a power source and a power conversion device for modifying the electrical power received at the class 1 connections. The configurable power supply box also comprises class 2 connections for delivering the modified electrical power from the power conversion device to one or more luminaires. The configurable power supply box further comprises a first set of fastener apertures disposed on the respective ends of the configurable power supply box for receiving grid mounting flanges and a second set of fastener apertures around the perimeter of the power supply box for attaching a ceiling flange.

These and other aspects, objects, features, and embodiments will be apparent from the following description and the appended claims.

BRIEF DESCRIPTION OF THE FIGURES

Reference will be made below to the accompanying drawings.

FIGS. 12a-1, 12a-2, 12b, 12c, and 12d are example illustrations of the configurable power supply box installed in different configurations in accordance with example embodiments of the disclosure.

FIGS. 13a-1, 13a-2, 13b, 13c, and 13d are example illustrations of the configurable power supply box installed in different configurations in accordance with example embodiments of the disclosure.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

The disclosure provides example embodiments of suspended luminaires that comprise a lightguide with an end cap at each end of the lightguide. Each endcap can comprise a contact block for receiving a pair of suspension cables for suspending the luminaire from a ceiling, grid, or other structure. At least one pair of the suspension cables can also be used to deliver electrical power to the luminaire. The suspension cables can receive electrical power from a configurable power supply box that can either be mounted to a ceiling or above a drop ceiling. The embodiments described herein are merely examples and variations on the examples provided herein are encompassed within this disclosure.

The example suspended luminaires described in this disclosure use a lightguide for transmitting light. A lightguide can comprise a panel, slab, plate, or related form that can be flat or curved and that comprises two major faces that are internally reflective. Light can be introduced into the lightguide from a first edge of the lightguide, so that the major faces guide the light towards a second edge. One or both of the major faces can have features that provide a controlled release of light flowing through the lightguide, to illuminate an area. Light can thus propagate in the lightguide via internal reflection from the two major faces, traveling from the light-source edge towards an opposing edge, and illumination light can escape from the lightguide through the major faces and the opposing edge. A light source can be positioned adjacent the first edge of the lightguide, so that the light source emits light into the lightguide via the first edge. LEDs are an example of the light source that can be used with the lightguide, including but not limited to discrete LEDs, arrays of LEDs, and chip-on-board LEDs.

The example suspended luminaires described herein can comprise a variety of components. Components can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example flow-through luminaire) can be made of one or more of a number of suitable materials, including but not limited to metal, ceramic, rubber, and plastic.

Terms such as "first," "second," "end," "inner," "outer," "inside," "outside," "upper," "lower," and "bottom" are used merely to distinguish one component (or part of a component or state of a component) from another. Such terms are not meant to denote a preference or a particular orientation. Also, the names given to various components described herein are descriptive of one or more embodiments and are not meant to be limiting in any way. For each figure, one or more of the components may be omitted, added, repeated, and/or substituted. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

Some representative embodiments will be described more fully hereinafter with example reference to the accompanying drawings that illustrate embodiments of the technology.

The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 1:
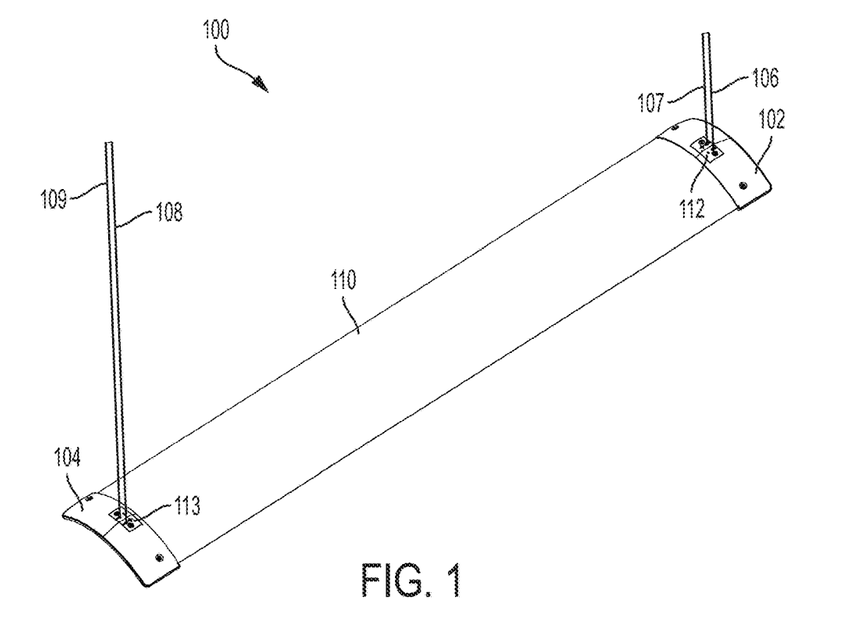
FIG. 1 is a top perspective view of a suspended luminaire in accordance with an example embodiment of the disclosure.
Figure 2:
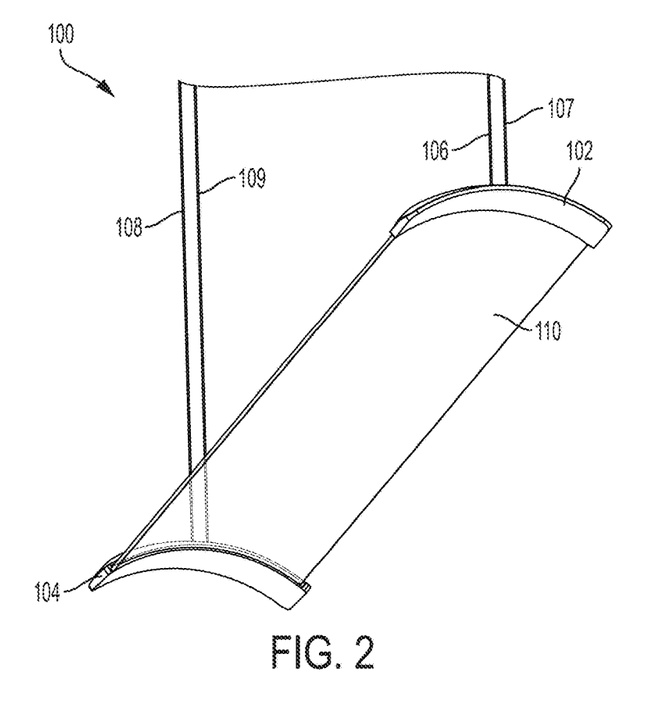
FIG. 2 is a bottom perspective view of the suspended luminaire in accordance with an example embodiment of the disclosure.

Referring now to FIGS. 1 and 2, an example suspended luminaire 100 is illustrated. The suspended luminaire 100 comprises two endcaps 102 and 104 and a lightguide 110. Although lightguide 110 is curved in the example of FIGS. 1 and 2, in alternate embodiments the lightguide can have a variety of other shapes. The suspended luminaire 100 can be suspended from a ceiling or other structure by cables 106, 107, 108, and 109. The cables 106, 107, 108, and 109 have sufficient strength to support the suspended luminaire 100 and they also can conduct electrical power to the suspended luminaire 100. The cables 106, 107, 108, and 109 can also be referred to powered aircraft cables.

Referring now to FIGS. 3-8, further details of the example suspended luminaire 100 are shown. Each endcap 102 and 104 comprises a top portion and a bottom portion that are fastened together and that clamp around each end of the lightguide 110. At least one of the endcaps 102 or 104 further comprises an LED board 120, which comprises one or more LEDs that emit light into one end of the lightguide 110. In alternate embodiments, the LED board 120 can be replaced with other arrangements of LEDs or other types of light sources. Additionally, in alternate embodiments, there can be an LED board located in each endcap so that light is emitted into each end of the lightguide 110. In an arrangement where only one endcap has an LED board, only one pair of cables conduct electrical power to the luminaire. Alternatively, in an arrangement where each endcap contains an LED board, both pairs of cables conduct electrical power to the luminaire.

Figure 3:
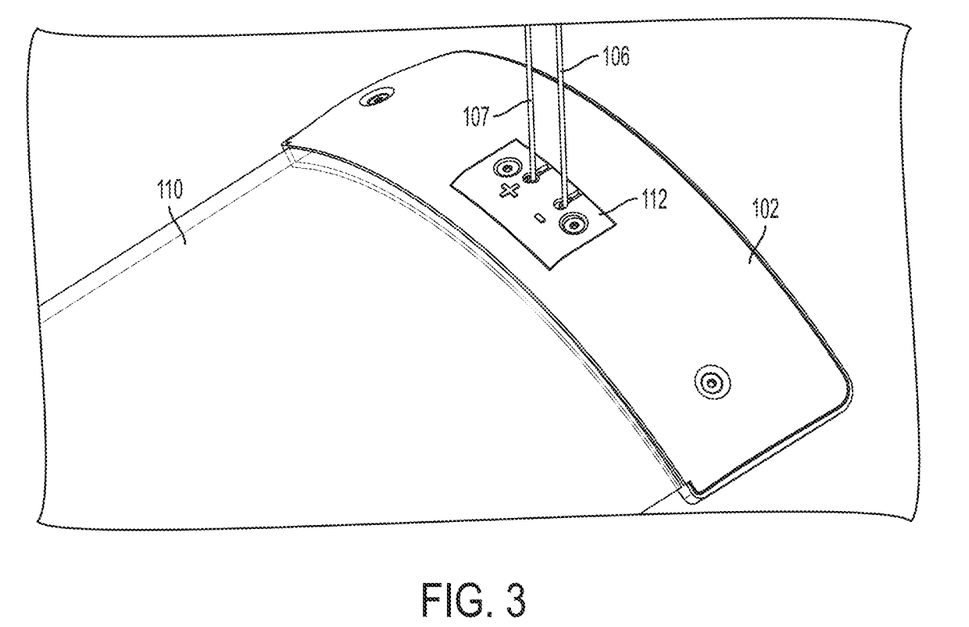
FIG. 3 is a view of an endcap of the suspended luminaire in accordance with an example embodiment of the disclosure.
Figure 4:
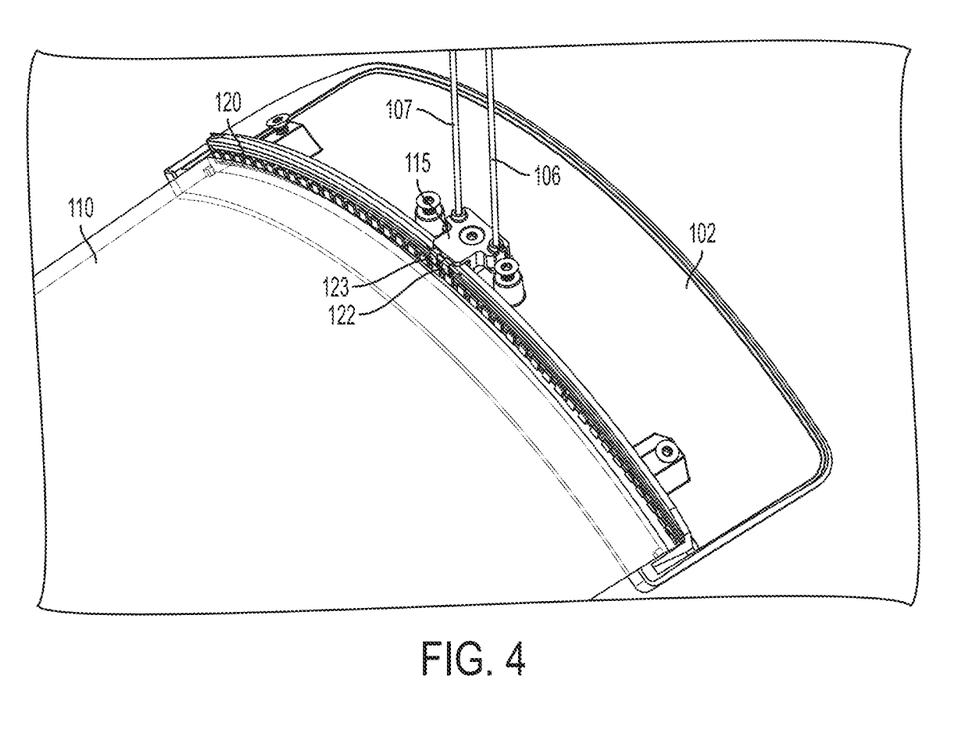
FIG. 4 is a view of the interior of the endcap with the top portion removed in accordance with an example embodiment of the disclosure.
Figure 7:
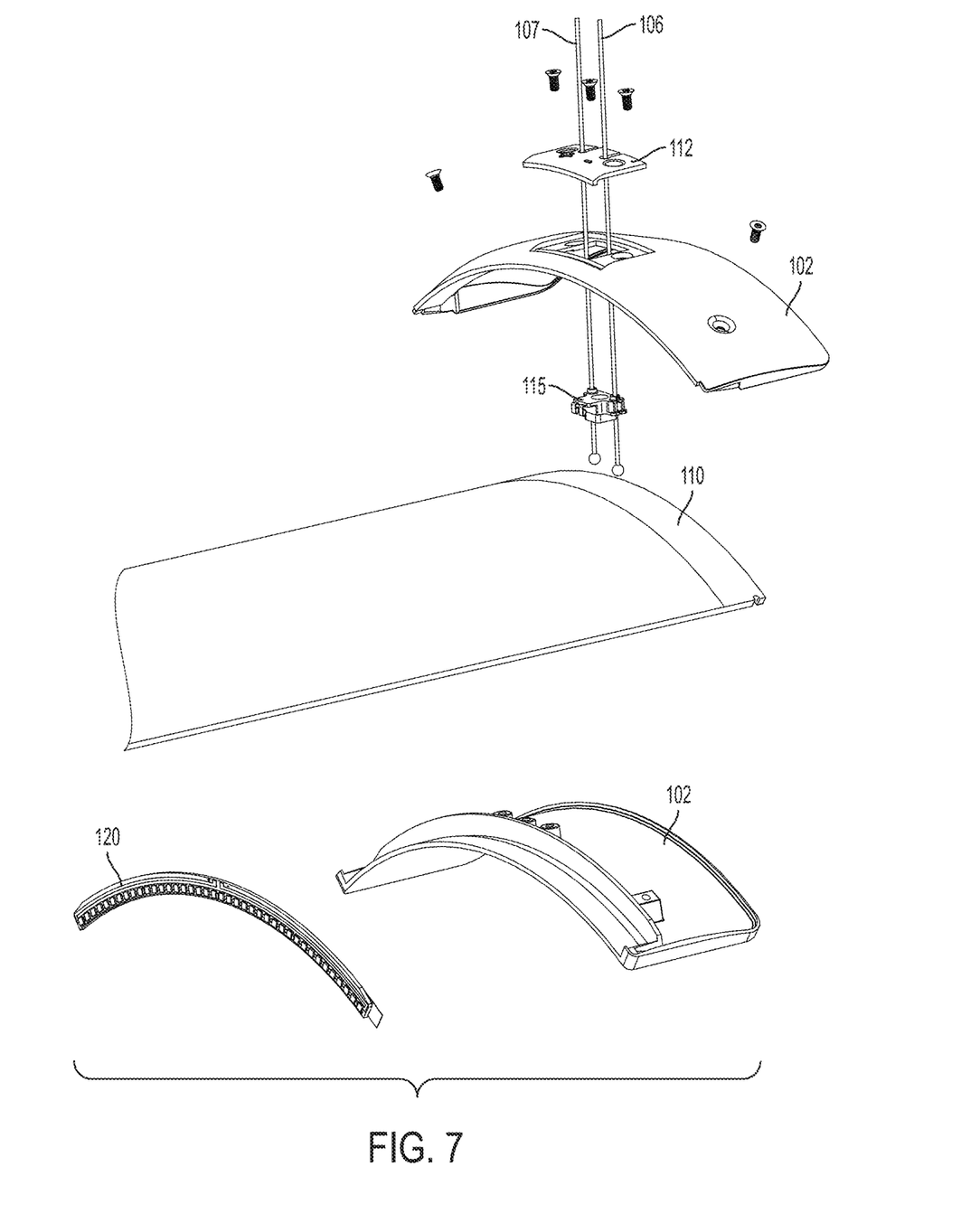
FIG. 7 is an exploded view of the suspended luminaire in accordance with an example embodiment of the disclosure.
Figure 8:
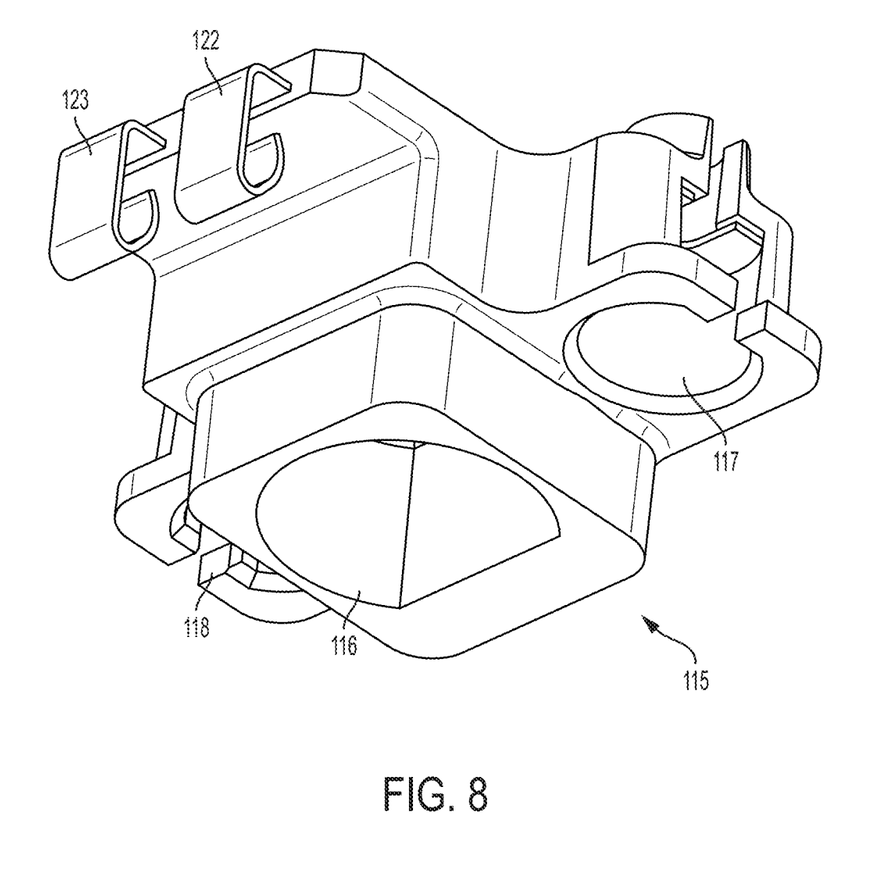
FIG. 8 is a bottom view of a contact block of the suspended luminaire in accordance with an example embodiment of the disclosure.
Figure 9A:
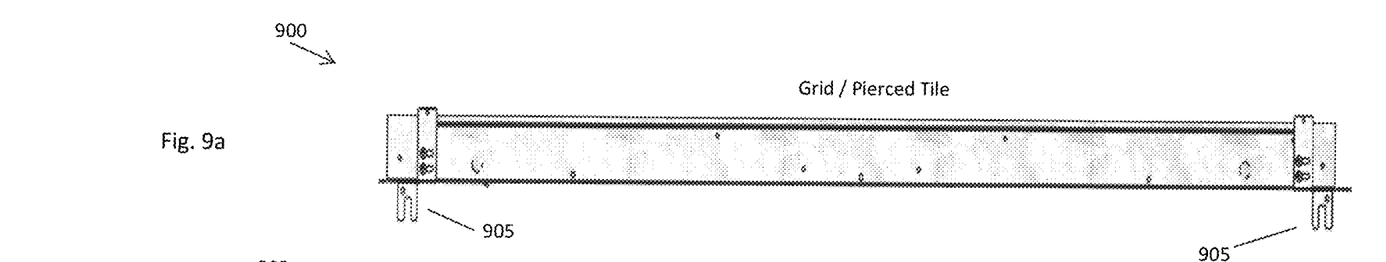
FIGS. 9a, 9b, 9c, and 9d are side views of example configurations of a configurable power supply box in accordance with an example embodiment of the disclosure.
Figures 9B, 9C, 9D:
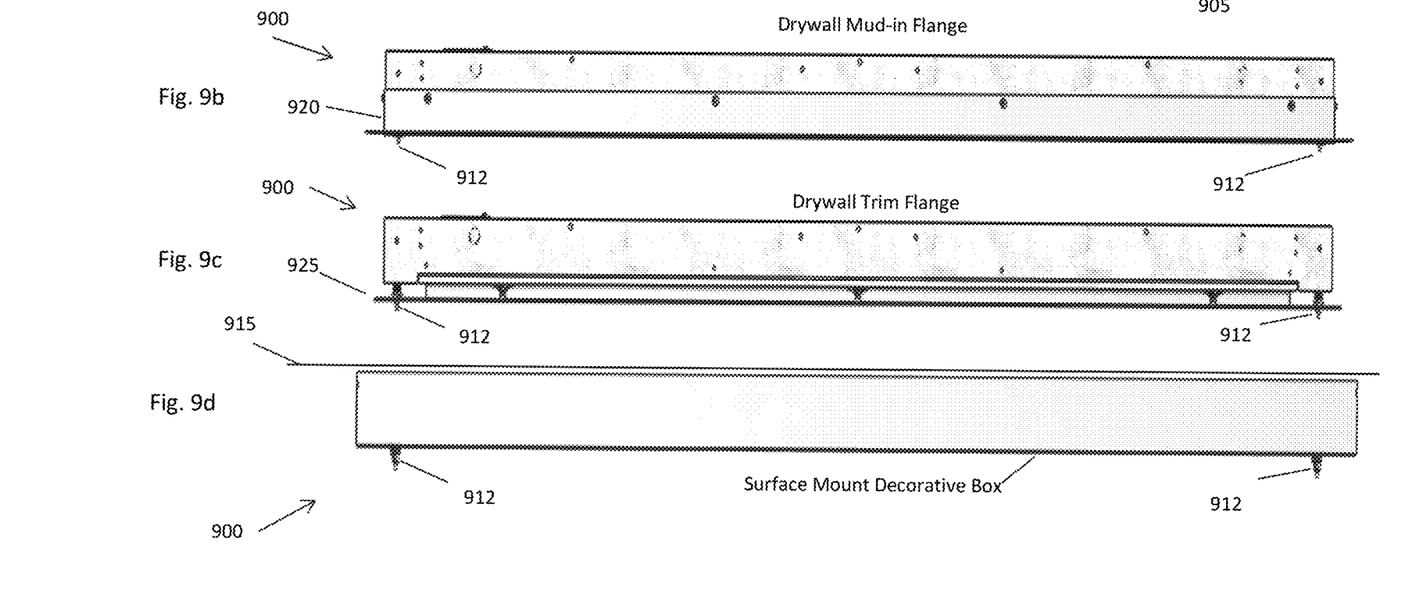
Figures 10A, 10B, 10C, 10D:
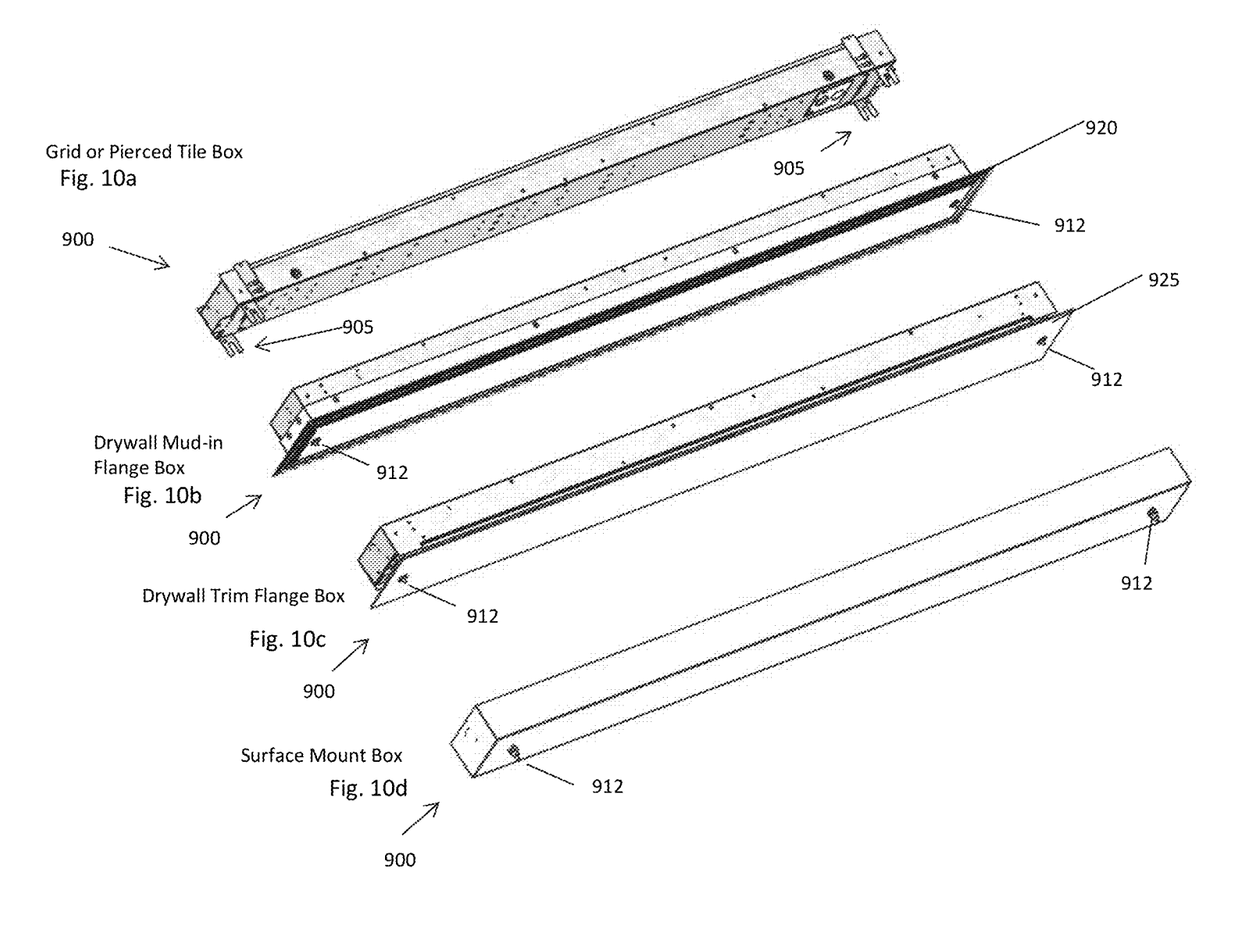
FIGS. 10a, 10b, 10c, and 10d are perspective views of example configurations of the configurable power supply box in accordance with example embodiments of the disclosure.
Figure 11A:
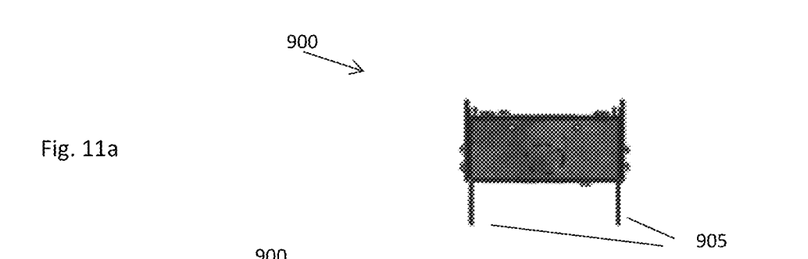
FIGS. 11a, 11b, 11c, and 11d are end views of example configurations of the configurable power supply box in accordance with example embodiments of the disclosure.
Figure 11B:
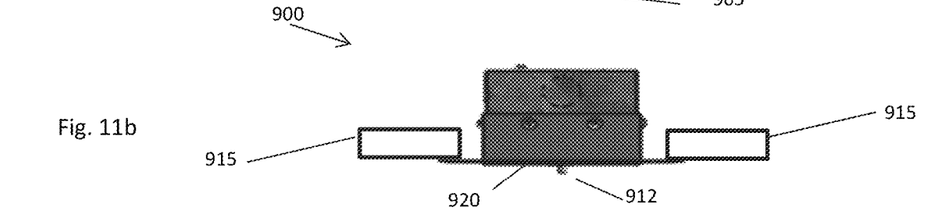
Figure 11C:
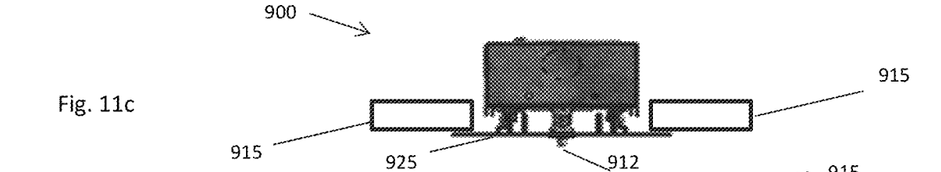
Figure 11D:
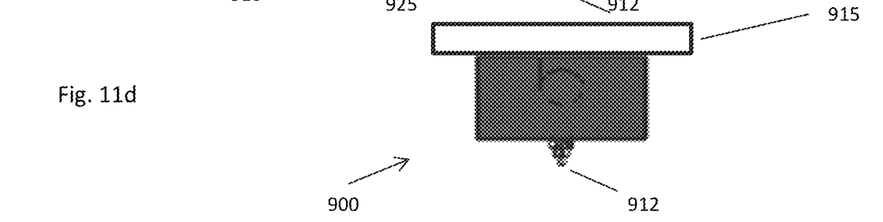
Figure 12A:
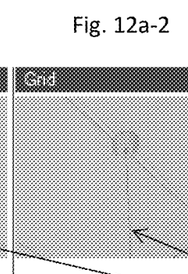
Figure 12A:
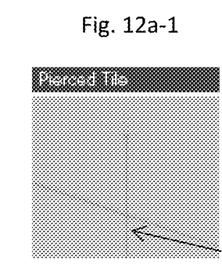
Figure 12B:
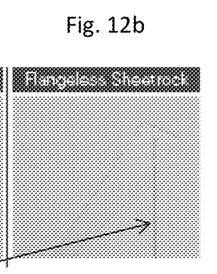
Figure 12C:
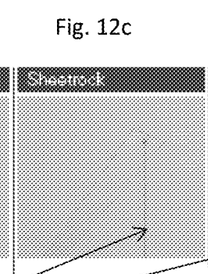
Figure 12D:
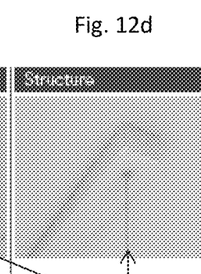

Each endcap 102, 104 further comprises a mounting cover 112, 113 that is fastened to the top portion of each endcap, for example, with fasteners as shown in the example of FIG. 3. The mounting covers 112, 113 comprise a pair of apertures through which cables 106, 107, 108, and 109 can pass as shown in the figures. Located beneath the mounting cover 112, 113 of each endcap 102, 104 is a contact block. An example contact block 115 is shown in FIGS. 4, 7, and 8. The contact block 115 provides an anchor to which the cable 106, 107, 108, and 109 can attach. The example contact block 115 comprises a center aperture 116 through which a fastener can pass to secure the contact block 115 to the bottom portion of the endcap 102, 104. The contact block 115 further comprises side apertures 117 and 118. The side apertures 117 and 118 each receive a cable, such as one of cables 106, 107, 108, and 109, as can be seen in FIGS. 4 and 7.

Figure 5:
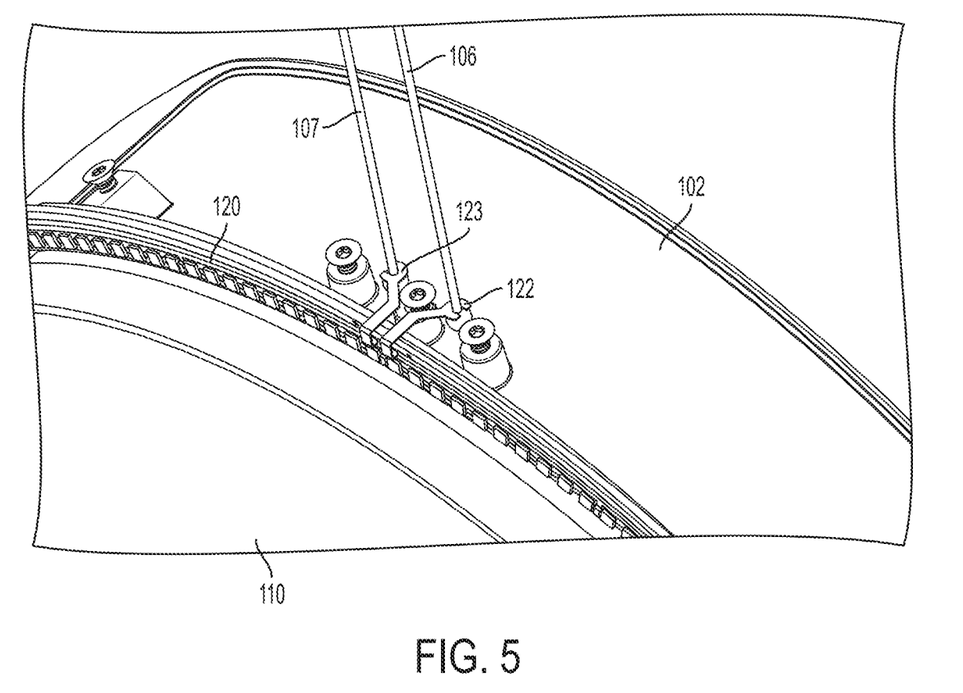
FIG. 5 is a view of the interior of the endcap with the contact block hidden from view in accordance with an example embodiment of the disclosure.
Figure 6:
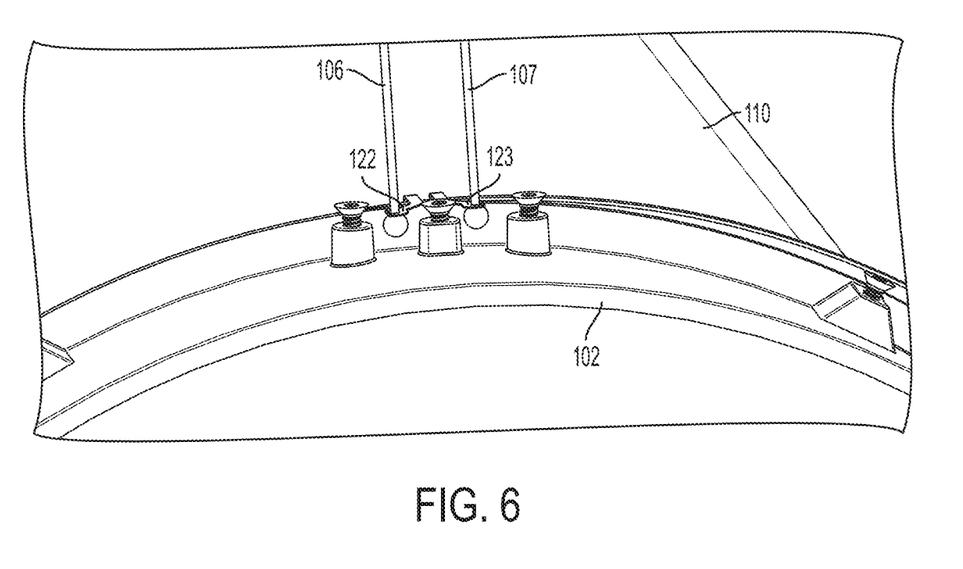
FIG. 6 is another view of the interior of the endcap with the contact block hidden from view in accordance with an example embodiment of the disclosure.

The contact block 115 is made of an electrically insulating material such as a plastic material. The contact block 115 also comprises two electrically conductive contacts 122 and 123 that pass through the contact block as shown in FIG. 8. The contacts 122 and 123 provide an electrical connection from the cables 106 and 107 to the LED board 120 thereby providing power to the LEDs. Specifically, the cables 106 and 107 comprise a ball-shaped terminal that permits each cable to fit within a slot on one end of each contact 122 and 123. In FIGS. 5 and 6 of example luminaire 100, the contact block 115 is hidden from view to more clearly illustrate the position of each cable 106 and 107 in each slot at the end of each contact 122 and 123. The ball-shaped terminal at the end of each cable 106 and 107 secures each cable within the slot of each contact 122, 123 and within the side apertures 117 and 118 of contact block 115.

The configuration of the contact block within each endcap provides a convenient solution for both suspending the luminaire and providing power to the luminaire. The configuration of the example suspended luminaire described herein eliminates the need to splice and connect wires at each luminaire, while safely and securely delivering power to the luminaire and suspending the luminaire. It should be understood that in alternate embodiments of the disclosure, the contact block can be replaced by one or more components having other shapes or forms. For example, the contact block can be replaced with a flange that is attached to or part of the top portion or the bottom portion of the endcap. Additionally, in alternate embodiments the mounting cover 112, 113 can be eliminated. These and other variations will be apparent to those of skill in this field.

Referring now to FIGS. 9a-15, configurations of an example configurable power supply box 900 are shown and described. The configurable power supply box 900 is typically located remotely from the one or more luminaires to which it is providing power, such as the suspended luminaire 100 described previously in connection with FIGS. 1-8. The configurable power supply box 900 can comprise one or more electrical components that provide power to luminaires, including but not limited to recessed luminaires or the suspended luminaires such as suspended luminaire 100. For example, the configurable power supply box 900 can comprise class 1 connections for receiving power from a power source, such as the electrical power grid or a renewable power source. The configurable power supply box 900 can also comprise one or more power supplies, such as a driver, transformer, or other power distribution module, for modifying the power received from the power source and can comprise low voltage connections, such as class 2 connections, for coupling to and delivering the modified power to a luminaire, such as via the cables 106 and 107. The configurable power supply box 900 uses grippers 912, also sometimes referred to as fittings, for connecting low voltage connections to conductive cables, such as cables 106, 107, 108, and 109, to deliver electrical power to the suspended luminaire. As illustrated in FIGS. 9a-14e, the configurable power supply box 900 also comprises apertures along the sides, bottom and top surfaces for receiving fasteners and can comprise knockouts for conduit that can be used for electrical connections to multiple configurable power supply boxes.

As illustrated in FIGS. 9a-15, the configurable power supply box 900 provides advantages in that it can be mounted to a variety of surfaces in a variety of configurations. The adaptability of the remote power box is achieved by the variety of configurations in which it can be implemented. In one example, as shown in FIGS. 9a, 10a, 11a, 12a-1, 12a-2, 13a-1, 13a-2, and 14e, the configurable power supply box 900 can accommodate grid mounting flanges 905 for mounting to a grid of a drop ceiling. As shown in the figures, the grid mounting flanges 905 can attach to apertures located on each end of the configurable power supply box 900. The grid mounting flanges 905 permit mounting of the configurable power supply box 900 to a grid as shown in FIG. 14e. As shown in the illustrations in FIGS. 12a-1, 12a-2, 13a-1, and 13a-2, the grid mounted configurable power supply box 900 can be used in either a pierced tile installation or a grid mounted installation. For simplicity, the grid 1410 located above the ceiling 915 is not shown in its entirety in FIGS. 13a-1 and 13a-2 and only the end portions of the hangar bar 1500 are shown in FIG. 13a-1.

In another example configuration shown in FIGS. 9b, 10b, 11b, 12b, and 13b, the configurable power supply box 900 can be mounted in a recess of a ceiling 915. A cover 920 is attached to the bottom side of the configurable power supply box 900 via torsion springs positioned within the box 900 and/or fasteners attached to apertures around the sides of the box 900. The cover 920 comprise a flange which rests against the ceiling 915 when installed and the flange can be covered with spackle. Low voltage, or class 2 wires, from the power supply within the configurable power supply box 900 can be attached to grippers 912.

In another example configuration shown in FIGS. 9c, 10c, 11c, 12c, and 13c, the configurable power supply box 900 is mounted in a similar manner as described in the preceding paragraph, except that a slightly different cover 925 is used wherein the trim flange of the cover 925 will not be covered with spackle, but will be exposed when installed. Lastly, another example configuration is shown in FIGS. 9d, 10d, 11d, 12d, and 13d wherein the configurable power supply box 900 is placed within a decorative outer box and surface mounted to a ceiling 915 so that the decorative box is visible once installed. The foregoing examples are non-limiting and the adaptability of the configurable power supply box 900 allows it to be used in other configurations as well.

Figures 14A, 14B, 14C, 14D, 14E, 14F:
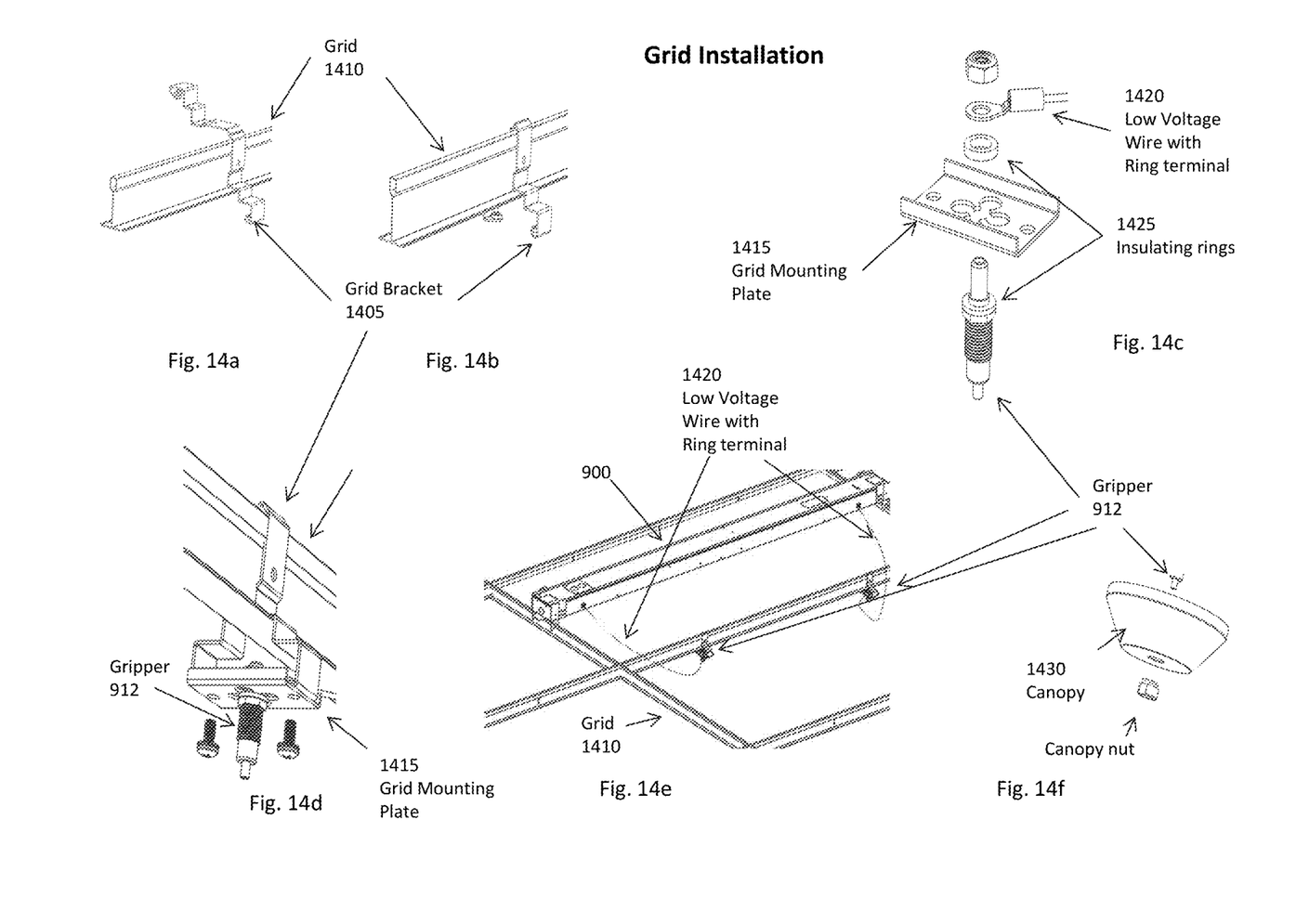
FIGS. 14a, 14b, 14c, 14d, 14e, and 14f illustrate an example method for installing a configurable power supply box on a ceiling grid above a drop ceiling in accordance with an example embodiment of the disclosure.

Referring now to FIGS. 14a-14f, an example method for installing the configurable power supply box 900 in a grid installation above a ceiling is shown. FIGS. 14a and 14b show a grid bracket 1405 being attached to a grid 1410. FIG. 14c shows the low voltage connection 1420 being attached to the gripper 912 and the grid mounting plate 1415. The grid mounting plate can have an aperture, such as the cloverleaf aperture shown in FIG. 14c, for receiving gripper 912. Insulating rings 1425 serve to insulate the grid mounting plate 1415 from the gripper 912 and the low voltage connection 1420. FIG. 14d illustrates the step of attaching the grid mounting plate 1415 with the gripper 912 to the grid bracket 1405. FIG. 14e illustrates the mounting of the configurable power supply box 900 to the grid 1410 with the low voltage connections 1420 running from the power supply within the box 900 to the grippers 912. Power cables, such as cables 106, 107, 108, and 109 can then be attached to the grippers to supply electrical power to a suspended luminaire. FIG. 14f is an optional step for grid installations wherein a decorative canopy 1430 can be attached to the bottom end of the gripper 912 to cover the aperture in the ceiling from which the gripper 912 exits.

Figures 13A, 13A:
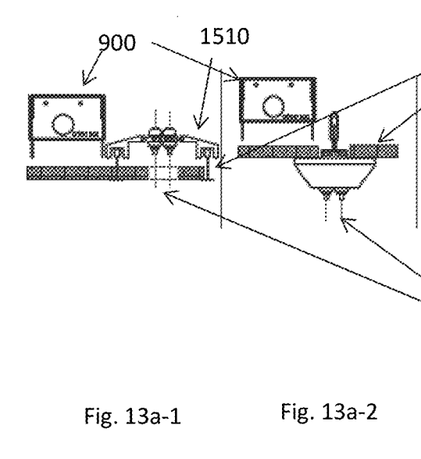
Figure 13B:
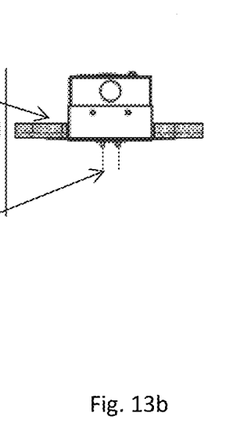
Figure 13C:
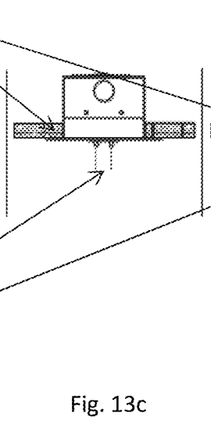
Figure 13D:
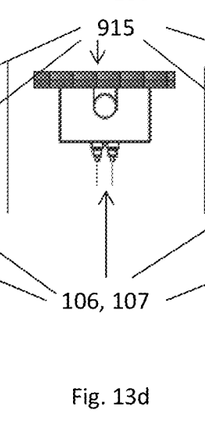
Figure 15:
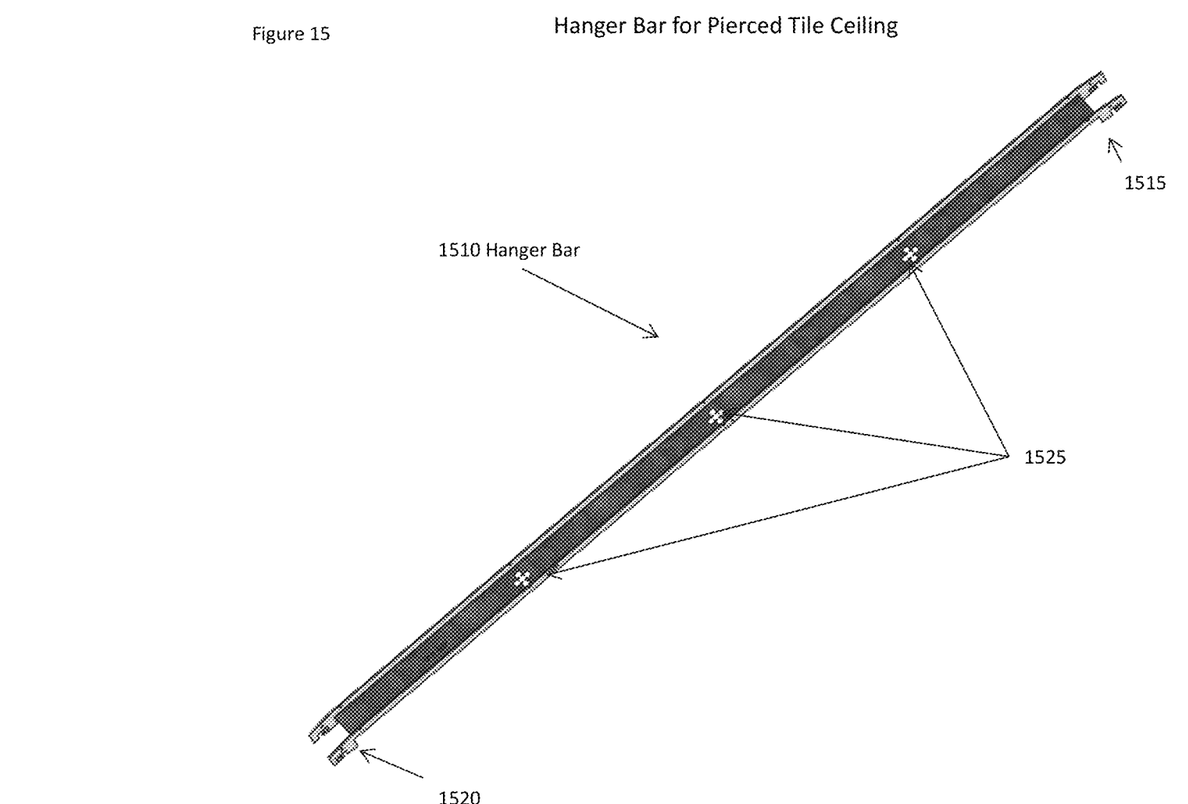
FIG. 15 illustrates an example of a hanger bar that can be used in a pierced ceiling configuration in accordance with example embodiments of the disclosure.

FIG. 15 shows an example hanger bar 1510 for use in a pierced ceiling tile installation such as the one shown in FIGS. 12a-1 and 13a-1 as an example. The ends of the hanger bar comprise hanger bar flanges 1515 and 1520 for mounting the hanger bar on top of a grid, such as grid 1410. Instead of the grid brackets 1405 and the grid mounting plate 1415 used in the example of a grid installation shown in FIGS. 14a-14f, the hanger bar has hanger bar apertures 1525 for receiving one or more grippers 912. The cloverleaf-shaped hanger bar apertures 1525 shown in the example of FIG. 15 can accommodate a pair of grippers 912. The hanger bar 1510 can have multiple hanger bar apertures 1525 to accommodate multiple suspended luminaires. Additionally, multiple hanger bars 1510 can be lined up end to end for continuous runs of installed suspended luminaires.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
   a lightguide;
   a first endcap on a first end of the lightguide and a second endcap on a second end of the lightguide;
   a first contact block disposed in the first endcap, the first contact block comprising a first block aperture and a second block aperture, the first contact block further comprising a first elongated contact with a first contact aperture and a second elongated contact with a second contact aperture, wherein the first block aperture and the first contact aperture are aligned to receive a first suspension cable, and wherein the second block aperture and the second contact aperture are aligned to receive a second suspension cable;
   a second contact block disposed in the second endcap, the second contact block comprising a third block aperture for receiving a third suspension cable and a fourth block aperture for receiving a fourth suspension cable;
   one or more LEDs disposed in the first endcap and oriented to emit light into a first edge of the lightguide, wherein the first elongated contact extends from the first block aperture and through the first contact block to directly engage a circuit board and the second elongated contact extends from the second block aperture and through the first contact block to directly engage the circuit board, the one or more LEDs being disposed on the circuit board, the first elongated contact and the second elongated contact providing electrical power from the first and second suspension cables directly to the circuit board;
   a first mounting cover that covers the first contact block and is removably attached to the first endcap; and
   a second mounting cover that covers the second contact block and is removably attached to the second endcap.

2. The luminaire of claim 1, wherein the lightguide, the first endcap, the second endcap, and the circuit board are curved.

3. The luminaire of claim 1, wherein the mounting cover has a pair of apertures through which the first and second suspension cables can pass.

4. The luminaire of claim 1, further comprising a power supply located in a ceiling to which the luminaire is attached, wherein the power supply provides the electrical power to the luminaire via the first and second suspension cables.

5. The luminaire of claim 1, further comprising a configurable power supply box that can be mounted to a ceiling or above the ceiling, the configurable power supply box comprising a power supply that supplies the electrical power via the first and second suspension cables.

6. The luminaire of claim 1, further comprising grippers for coupling the first, second, third, and fourth suspension cables to a power supply.

7. The luminaire of claim 1, wherein the second endcap further comprises:
   a second set of one or more LEDs disposed in the second endcap and oriented to emit light into a second edge of the lightguide; and
   a second pair of contacts located within the second endcap, the second pair of contacts disposed to receive electrical power from the third and fourth suspension cables and transmit the electrical power from the third and fourth suspension cables to the second set of one or more LEDs disposed in the second endcap.

8. The luminaire of claim 7, wherein the third and fourth suspension cables receive the electrical power from a power supply located in a ceiling to which the luminaire is attached.

9. The luminaire of claim 1, further comprising the first suspension cable and the second suspension cable coupled to the first contact block and the third suspension cable and the fourth suspension cable coupled to the second contact block.

10. The luminaire of claim 9, wherein the first and second suspension cables each have a ball terminal at an end of each suspension cable.

11. The luminaire of claim 10, wherein a diameter of the ball terminal at the end of each suspension cable is larger than a diameter of the first block aperture and the second block aperture.

* * * * *